United States Patent
Meisler

(10) Patent No.: US 10,850,672 B1
(45) Date of Patent: Dec. 1, 2020

(54) AUTOMOBILE HEADREST SAFE

(71) Applicant: Irving David Meisler, Birmingham, AL (US)

(72) Inventor: Irving David Meisler, Birmingham, AL (US)

( * ) Notice: Subject to any disclaimer, the term of this patent is extended or adjusted under 35 U.S.C. 154(b) by 0 days.

(21) Appl. No.: 16/586,541

(22) Filed: Sep. 27, 2019

(51) Int. Cl.
| | |
|---|---|
| *B60R 7/00* | (2006.01) |
| *B60R 7/04* | (2006.01) |
| *F41C 33/06* | (2006.01) |
| *B60R 7/14* | (2006.01) |

(52) U.S. Cl.
CPC ............... *B60R 7/043* (2013.01); *B60R 7/14* (2013.01); *F41C 33/06* (2013.01)

(58) Field of Classification Search
CPC ............ B60R 7/043; B60R 7/14; F41C 33/06
USPC ......................................................... 224/275
See application file for complete search history.

(56) References Cited

U.S. PATENT DOCUMENTS

| | | | | |
|---|---|---|---|---|
| 3,437,374 A | * | 4/1969 | Bennett ................ | A47C 27/081 297/391 |
| 3,449,011 A | * | 6/1969 | Edwards ................. | B60N 3/08 297/391 |
| 3,568,890 A | * | 3/1971 | Leachman ............. | B60N 2/879 222/183 |
| 4,524,904 A | * | 6/1985 | Masse ..................... | B60R 7/087 109/45 |
| 5,996,865 A | | 12/1999 | Bissey | |
| 6,215,518 B1 | * | 4/2001 | Watkins .................. | B60R 11/02 348/148 |
| 6,445,408 B1 | * | 9/2002 | Watkins .................. | B60R 11/02 348/148 |
| 7,188,896 B2 | * | 3/2007 | Embach .................. | B60R 7/043 297/217.4 |
| 7,305,858 B1 | * | 12/2007 | Wu ......................... | B60R 7/087 109/47 |
| 7,980,630 B2 | * | 7/2011 | Pos ......................... | B60N 2/286 297/217.3 |
| 8,967,538 B2 | * | 3/2015 | Guering ............... | A62B 25/005 244/118.5 |
| 9,283,876 B2 | * | 3/2016 | Dinger ..................... | B60N 2/80 |
| 10,232,790 B1 | | 3/2019 | Adrain | |
| 10,406,957 B2 | * | 9/2019 | Faruque .................. | B60N 2/879 |
| 2008/0196637 A1 | * | 8/2008 | Howell ................... | E05G 1/005 109/38 |
| 2010/0043682 A1 | * | 2/2010 | Talmage ................... | E05G 1/00 109/50 |

(Continued)

FOREIGN PATENT DOCUMENTS

| | | |
|---|---|---|
| KR | 19980001253 | 3/1998 |
| WO | WO2013043138 | 3/2013 |

*Primary Examiner* — Peter N Helvey
(74) *Attorney, Agent, or Firm* — Baker Donelson Bearman Caldwell and Berkowitz, PC

(57) ABSTRACT

An automobile headrest safe is disclosed which is used in conjunction with the seat of the automobile. The headrest safe includes an exterior housing with a front surface, a rear surface, a left side surface, a right side surface, a top surface, and a bottom surface. The exterior housing includes an exterior cover and a soft cushion material. The headrest safe also includes a hollow metal positioned within the interior of the exterior housing. The container has a main portion and a spring biased pivotal side door. The pivotal side door is coupled to a biometric lock. The lock is mounted to the top surface closest to the side door.

10 Claims, 2 Drawing Sheets

(56) References Cited

U.S. PATENT DOCUMENTS

| | | | |
|---|---|---|---|
| 2017/0050545 A1* | 2/2017 | Aguilar Ruelas | B60R 7/043 |
| 2017/0138112 A1* | 5/2017 | Makke | G01S 5/0027 |
| 2018/0073836 A1* | 3/2018 | Romeo | F41A 17/066 |
| 2019/0102963 A1 | 4/2019 | Owens et al. | |

* cited by examiner

US 10,850,672 B1

AUTOMOBILE HEADREST SAFE

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

TECHNICAL FIELD

The present disclosure relates to safes, and more particularly, the disclosure relates to a gun safe which is found in an automobile.

BACKGROUND OF THE INVENTION

Safes have been used for decades to allow for the storage of items, such as guns while preventing the unauthorized access to the guns therein. Many safes use a metal enclosure having a lock. The lock may be in the form of a combination lock, key lock, or a more modern biometric lock which is access through a person's fingerprint or the like.

Guns are oftentimes transported or stowed inside cars for the protection of the occupant. While guns may be stowed within a console or glove box of a car, these are not considered to be a gun safe as they do not have the necessary lock and tamper resistance capabilities. A car storage compartment has also been designed to be included into the headrest of a seat, as shown in Korean Patent Application KR19980001253. However, here again, the headrest storage compartment does not include a lock or the tamper resistant capabilities to prevent access to a gun therein. Furthermore, the access to the interior area of the storage compartment is difficult for a driver.

Some gun safes have been adapted to be used within automobiles or cars. These gun safes may be in the form of a metal box which is simply secured to the car, such as that shown in U.S. Pat. No. 5,996,865. Gun safes have also been designed to be incorporated into the glove box or console of a car, as shown in U.S. Patent Application No. 20190102963. A gun safe has also been designed to be incorporated into the structure of a car's sun visor, as shown in U.S. Pat. No. 10,232,790. While these gun safes provide a secure structure for the safe storage of a gun, they require the use of multiple hands to operate and are not the most direct access to the gun within the safe.

Accordingly, it is seen that a need remains for a gun safe which is incorporated into an automobile for the safe storage yet easy access to a gun therein. It is to the provision of such therefore that the present invention is primarily directed.

BRIEF SUMMARY OF THE INVENTION

A safe adapted to be mounted to an automobile seat comprises an exterior housing including a flexible cover having a front surface oriented relative to the front surface of the automobile seat, a rear surface oppositely disposed from the front surface, two oppositely disposed side surfaces extending between the front surface and the rear surface, a top surface extending between the front surface and the rear surface, and a bottom surface extending between the front surface and the rear surface, one side surface has a pivotally mounted door portion. The safe also has a container mounted within the exterior housing which includes a main portion and a container door pivotally mounted to the main portion. The container door is coupled to the exterior housing door portion. The safe also has a lock coupled to the exterior housing and the container door to prevent the opening of the container door when in a locked position and to allow the opening of the container door when in an unlocked position.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Figure 1:
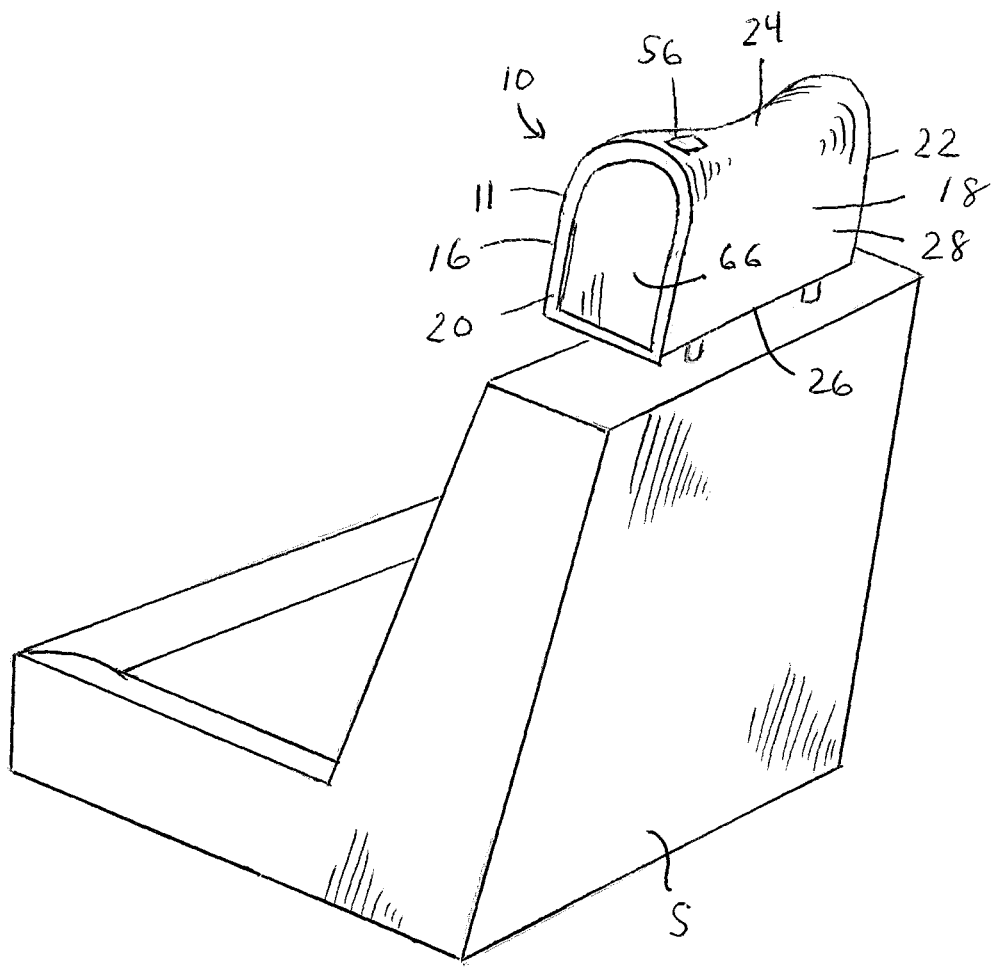
FIG. 1 is a perspective view of an automobile headrest safe embodying principles of the invention.

With reference next to the drawings, there is a shown an automobile headrest safe 10, and particularly an automobile headrest gun safe 10 in a preferred form of the present invention. The headrest safe 10 is used in conjunction with the seat S of the automobile, and preferably is aesthetically designed to be substituted for the standard seat headrest of the automobile to provide a uniform appearance to the automobile's interior.

The headrest safe 10 includes an exterior housing 12 which is made of a material and shaped to conform to or resemble the standard, stock headrest of that particular automobile. The exterior housing 12 includes a front surface 16 which faces forward with respect to the automobile, a rear surface 18 facing rearwardly, a left side surface 20, a right side surface 22, a top surface 24 and a bottom surface 26. The left and right side surfaces 20 and 22 face laterally with respect to the automobile so that one side surface faces either the driver when mounted to the passenger seat or faces the passenger when mounted to the driver's seat. The exterior housing 12 has a flexible exterior cover 28 and a soft cushion or filler material 30 underlying the cover 28.

Figure 2:
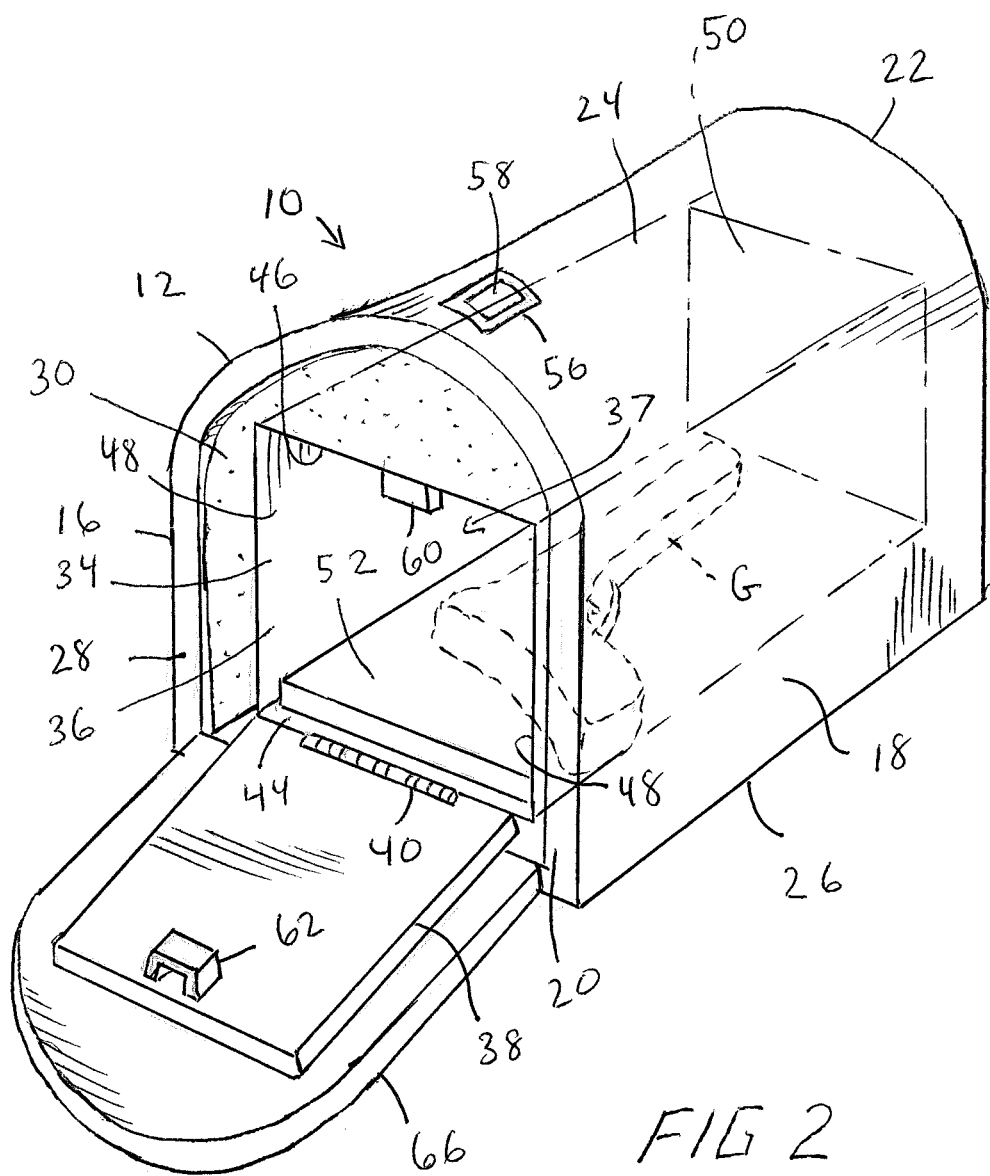
FIG. 2 is a perspective view of a portion of the automobile headrest safe of FIG. 1, showing the safe door in an open configuration.

A hollow metal enclosure, housing, box or container 34 is positioned within the interior of the exterior housing 12. The container 34 includes a tubular main or body portion 36 having an open end or opening 37 and a pivotal, reciprocating side door 38 having a spring 40 which biases the side door 38 from a closed position closing the body portion opening 37, shown in FIG. 1, to an open position allowing access to the interior of the container 34 through opening 37, shown in FIG. 2. The main portion 36 has a bottom wall 44, top wall 46, two side walls 48, and an end wall 50 oppositely disposed from the side door 38. The container 34 may include a soft foam, or similar material, floor 52 overlying the bottom wall 44 to prevent an item, such as a pistol or gun G, from sliding within the container 34. The floor 52 may be contoured to snugly hold a gun or pistol.

The pivotal side door 38 is coupled to a lock or locking device 56 which prevents the unauthorized opening of the side door 38. The lock 56 is preferably a biometric lock having a fingerprint reader 58 mounted to the top surface 24 closest to and directly above the side door 38. The lock 56 includes a latch 60 which engages a catch 62 mounted to the side door 38. The lock 56 maintains the side door 38 in its closed or locked position.

The exterior cover 28 is configured to include a pivotal side door portion 66 which overlies the container side door 38. The side door portion 66 and underlying door 38 are preferably located on the left side surface 20 of a passenger seat so that the side door portion 66 is facing the driver of the automobile, assuming a left side driver's seat position. Of course, should the headrest safe be mounted to a driver's seat, the side door portion 66, and underlying side door 38, should be positioned on the right side surface 22 facing the passenger positioned on the passenger seat. The side door portion 66 moves in unison with the container side door 38 between a closed or locked position and an open position.

The headrest safe 10 may be coupled to the automobile seat through any conventionally known mounting means, and preferably couples to the seat through the same means as the original manufactured car seat headrest. For example, the headrest 10 may be coupled to the seat through a single mounting post, double mounting posts, or the like. The mounting means should be robust enough to prevent the theft of the headrest safe by its forcible removal from the seat.

In use, the headrest safe 10 is coupled to the seat S of an automobile in the same position as the originally manufacturer's headrest. As the headrest safe is primarily configured to be accessible to the automobile driver, the headrest safe 10 is shown mounted to the passenger seat of the automobile. As such, the headrest door portion 66 and underlying container door 38 are on the left side of the headrest facing the driver, although the opposite configuration may be made should the headrest safe 10 be mounted to the driver's seat for use and access by a passenger, again assuming a left drive automobile.

A person may place a piston or gun G within the headrest safe 10 by opening the container side door 38 and side door portion 66 through the unlocking activation of the lock 56, by placing a recognized, preprogrammed finger upon the fingerprint reader 58. The authorization or recognition of the fingerprint upon the fingerprint reader 58 activates the lock 56 so that the latch 60 releases the catch 62, which allows the biasing force of the spring 40 to move the side door 38 and side door portion 66 from its closed position to its open position. The person may now place the pistol within the container 34 and upon the floor 52. The side door 38 and coupled side door portion 66, may then be moved to the closed or locked position to secure the piston within the headrest safe 10.

Should it be necessary to quickly access the pistol contained within the headrest safe 10, the driver need only reach over to the headrest safe 10 and place a finger upon the fingerprint reader 58. The reading of the driver's fingerprint activates the lock 56, which releases the catch 62 from the lock latch 60 causing the automatic opening of the side door 38 and side door portion 66 through the biasing force of the spring 40. With the side door 38 now open, the driver may reach into the container 34 through opening 37 and extract the pistol.

It should be noted that by placing the fingerprint reader in a position on top of the safe 10 and closest to the driver, the driver's hand unlocking the safe is already in a position close to the door opening 37 for quick access to the interior of the safe for fastest removal of the gun. This also allows for the unlocking of the safe and the extraction of the gun therein with the use of a single hand, rather than having to use two hands like those gun safes of the prior art. This position also allows the driver to grasp the headrest with the other fingers while placing a finger on the fingerprint reader, allowing for a steady positioning of the hand for a more reliable reading of the fingerprint.

It should also be noted that the positioning of the side door 38 on the side of the headrest allows for direct access by the person in the oppositely disposed seat. This is a distinct advantage over the prior art wherein the door was positioned on the rear of the headrest, facing the back of the automobile. Such a rearward facing door does not allow for quick and access to the interior of the headrest container and the pistol therein.

Lastly, it should also be noted that the spring loading of the side door 38 provides for a quick and reliable opening of the side door with minimal effort. Again, this allows for the quick access of the interior of the headrest container and the pistol therein.

Variations of the headrest safe fall within the spirit of the claims, below. It will be appreciated that the inventions are susceptible to modification, variation, and change without departing from the spirit thereof.

The invention claimed is:

1. A safe adapted to be mounted to an automobile seat, the safe comprising,
    an exterior housing having a front surface oriented relative to the front surface of the automobile seat, a rear surface oppositely disposed from said front surface, two oppositely disposed side surfaces extending between said front surface and said rear surface, a top surface extending between said front surface and said rear surface, and a bottom surface extending between said front surface and said rear surface, one said side surface having a pivotal door portion;
    a container mounted within said exterior housing, said container having a main portion and a container door pivotally mounted to said main portion for reciprocal movement between a closed position and an open position, said container door being fixedly coupled to said exterior housing door portion for simultaneous movement of both said exterior housing pivotal door portion and said container door, and
    a lock coupled to said exterior housing and said container door to prevent the opening of said container door and said exterior housing pivotal door portion when in a locked position and to allow the opening of said container door and said exterior housing pivotal door portion when in an unlocked position.

2. The safe of claim 1 wherein said lock is a biometric lock.

3. The safe of claim 2 wherein said biometric lock is a fingerprint reader lock.

4. The safe of claim 1 wherein said lock is coupled to said top surface of said exterior housing.

5. The safe of claim 1 wherein said container door includes a spring for biasing said container door from the closed position to the open position.

6. An automobile seat safe comprising,
    a seat having a backrest portion and a seating portion forward of said backrest portion, the backrest portion including a headrest, said headrest having an exterior cover with a forward facing front surface, a rear surface oppositely disposed from said front surface, two oppositely disposed side surfaces extending between said front surface and said rear surface, a top surface extending between said front surface and said rear surface, and a bottom surface extending between said front surface and said rear surface, one said side surface including a door portion;

an interior housing mounted within said exterior cover, said interior housing having a tubular body portion having an opening therein and an interior housing door pivotally mounted to said body portion to close said opening, said cover door portion overlying and fixedly coupled to said interior housing door, and a lock coupled to said interior housing door to prevent the opening of said interior housing door and said door portion when in a locked position and allowing the simultaneous opening of said container door and said door portion when in an unlocked position.

7. The safe of claim 6 wherein said lock is a biometric lock.

8. The safe of claim 7 wherein said biometric lock is a fingerprint reader lock.

9. The safe of claim 6 wherein said lock is coupled to a top surface of said headrest.

10. The safe of claim 6 wherein said interior housing door includes a spring for biasing said container door to an open position.

* * * * *